United States Patent

[11] 3,576,964

[72] Inventor Alvin R. Williams
        Northfield, Ohio
[21] Appl. No. 828,296
[22] Filed May 27, 1969
[45] Patented May 4, 1971
[73] Assignee United States Steel Corporation

[54] WELDED JOINT
7 Claims, 1 Drawing Fig.

[52] U.S. Cl. .................................................. 219/92,
                                                         219/91
[51] Int. Cl. ........................................... B23k 11/10
[50] Field of Search ........................................ 219/91, 92

[56] References Cited
UNITED STATES PATENTS
| | | | |
|---|---|---|---|
| 3,515,841 | 6/1970 | King ............................. | 219/91 |
| 3,277,268 | 10/1966 | Williams et al. .............. | 219/92 |
| 3,337,711 | 8/1967 | Garscia ......................... | 219/92 |

Primary Examiner—J. V. Truhe
Assistant Examiner—Hugh D. Jaeger
Attorney—R. J. Leek, Jr.

ABSTRACT: A welded joint is disclosed having an S-shaped metal connector provided with a first laminate cavity and a second laminate cavity, a first adhesively bonded laminate disposed in the first laminate cavity, and a second adhesively bonded laminate disposed in the second laminate cavity. The first adhesively bonded laminate and the second adhesively bonded laminate, each has a first metal member, a second metal member and an electrically insulating adhesive between the first metal member and the second metal member. The first adhesively bonded laminate and the second adhesively bonded laminate are disposed in the first laminate cavity and the second laminate cavity respectively so that the first metal members and the second metal members are in contact with the metal connector and are welded together.

PATENTED MAY 4 1971          3,576,964
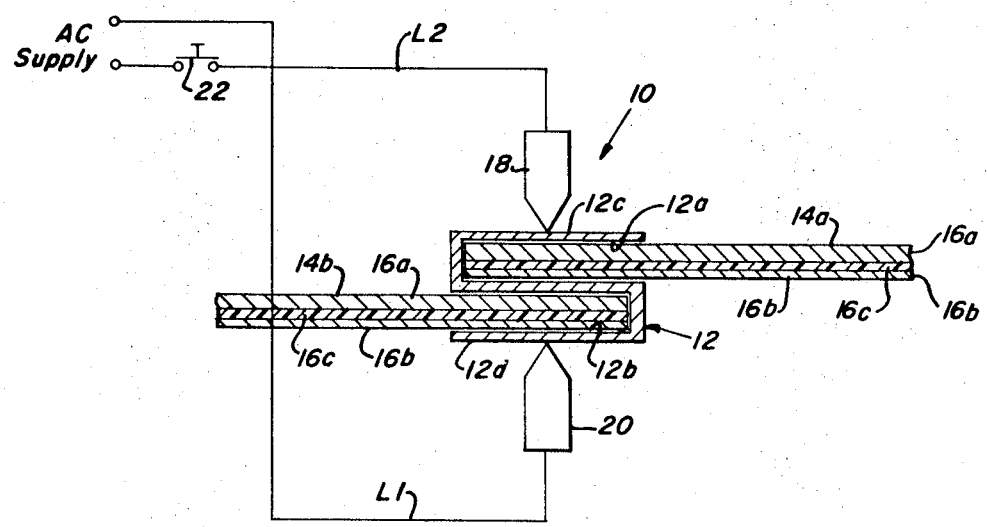
INVENTOR
ALVIN R. WILLIAMS
Attorney

WELDED JOINT

BACKGROUND OF THE INVENTION

Heretofore, the adhesive in an adhesively bonded laminate acted as a heat and electrical insulator between the first metal member and the second metal member of the laminate, thereby rendering impossible the resistance welding of the laminate to another laminate. Welding was accomplished by fastening the two laminates tightly together with one or more rivets or bolts and then applying the welding current. However, this method requires the step of punching or drilling holes in the laminates to be welded.

I am aware of the following conventional prior art welding methods and apparatus:

U.S. Pat. Nos. 1,568,080, Meadowcroft, issued Jan. 5, 1926; 2,452,805, Sussenbach, issued Nov. 2, 1948; 3,036,200, Keefe, issued May 22, 1962; 3,277,268, Williams et al., issued Oct. 4, 1966.

OBJECTS OF THE INVENTION

It is the general object of this invention to avoid and overcome the foregoing and other difficulties of and objections to prior art practices by the provision of a welded joint which:
a. has a satisfactory weld between a first adhesively bonded laminate and a second adhesively bonded laminate, and
b. eliminates the conventional drilling and riveting of the lapped laminates prior to welding.

BRIEF SUMMARY OF THE INVENTION

The aforesaid objects of this invention, and other objects which will become apparent as the description proceeds, are achieved by providing a welded joint.

The welded joint has an S-shaped metal connector provided with a first laminate cavity and a second laminate cavity, a first adhesively bonded laminate disposed in the first laminate cavity, and a second adhesively bonded laminate disposed in the second laminate cavity. The first adhesively bonded laminate and the second adhesively bonded laminate each have a first metal member, a second metal member and an electrically insulating adhesive between the first metal member and the second metal member. The first adhesively bonded laminate and the second adhesively bonded laminate are disposed in the first laminate cavity and the second laminate cavity respectively so that the first metal members and the second metal members are in contact with the metal connector and are then welded together.

BRIEF DESCRIPTION OF THE VIEWS OF THE DRAWING

For a better understanding of this invention reference should be had to the accompanying drawing, wherein like numerals of reference indicate similar parts throughout the single view and wherein the sole FIG. is a fragmentary schematic sectional view of the apparatus for forming a welded joint between two adhesively bonded laminates.

Although the principles of this invention are broadly applicable to welding of joints between metal parts, this invention is particularly adapted for use in conjunction with the forming of a welded joint between two adhesively bonded laminates and hence it has been so illustrated and will be so described.

DETAILED DESCRIPTION

With specific reference to the form of this invention illustrated in the drawing, an apparatus for making a welded joint is indicated generally by the reference numeral 10.

This apparatus 10 has an S-shaped metal connecter 12 positioned adjacent a welding zone. The connector 12 is provided with a first laminate cavity 12a and a second laminate cavity 12b and has a first contact surface 12c and a second contact surface 12d.

A first adhesively bonded laminate 14a is disposed or positioned in the first laminate cavity 12a and a second adhesively bonded laminate 14b is positioned in the second laminate cavity 12b. Each of the laminates 14a, 14b has a first metal member, such as a stainless steel strip 16a or the like, a second metal member, suitably an aluminum strip 16b or the like, and an electrically insulating adhesive 16c, such as 4000 adhesive 16c. Cybond is the trade name of American Cyanamid Laboratories for a polyurethane adhesive. The laminates 14a, 14b are positioned in the first laminate cavity 12a, and the second laminate cavity 12b respectively so that the stainless steel strips 16a and aluminum strips 16b are in contact with the metal connector 12.

A first welding electrode 18 is in contact with one surface of the first contact surface 12c and the second contact surface 12d (in this case the first contact surface 12c) and a second welding electrode 20 is in contact with the other surface of the first contact surface 12c and the second contact surface 12d (i.e. the second contact surface 12d).

The electrodes 18,20 are connected by lines L1,L2 (and in line L2 through a switch 22 to a voltage supply indicated by the legend "AC Supply." The electrodes 18,20 weld, as by electric resistance welding, the laminates 14a,14b to the metal connector 12 to form the welded joint.

It will be understood that the laminates 14a,14b may be other laminates, such as stainless steel on galvanized steel, aluminum on steel, copper on aluminum, bronze on galvanized, stainless steel on lead or the like. Further, other adhesives, such as the following may be employed:

| Trademark or Trade Name | Manufacturer |
| --- | --- |
| "Surlyn" A ionomer resin | E. I. duPont de Nemours & Co. |
| "Bakelite" phenoxy resins PKHH and PAHJ. | Union Carbide Corporation. |
| "Scotch-Held" brand structural adhesives. | 3M Company. |
| A-1103-B adhesive | B. F. Goodrich Industrial Products Company. |
| USS "Nexus" PQE-1 polymeric material. | United States Steel Corporation. |

WELDED JOINT

A welded joint is provided utilizing the S-shaped metal connector 12, which connecter 12 is provided with the first laminate cavity 12a and the second laminate cavity 12b. The first adhesively bonded laminate 14a is disposed in the first laminate cavity 12a and the second adhesively bonded laminate 14b is disposed in the second laminate cavity 12b. The first adhesively bonded laminate 14a and the second adhesively bonded laminate 14b each have the first metal member 16a, the second metal member 16b and the electrically insulating adhesive 16c between the first metal member 16a and the second metal member 16b. The first adhesively bonded laminate 14a and the second adhesively bonded laminate 14b are disposed in the first laminate cavity 12a and the second laminate cavity 12b respectively so that the first metal members 16a and the second metal members 16b are in contact with the metal connector 12 and are welded together.

As shown in the drawing the first laminate cavity 12a and the second laminate cavity 12b may provide a clearance fit for the first laminate 14a and the second laminate 14b and the electrodes 18,20 may force the metal surfaces into contact. Alternatively a snug fit may be provided and the laminates 14a,14b forced into the cavities 12a,12b to form the desired metal contact.

SUMMARY OF THE ACHIEVEMENT OF THE OBJECTS OF THE INVENTION

It will be recognized by those skilled in the art that the objects of this invention have been achieved by providing a welded joint which:
a. satisfactorily provides a weld between a first adhesively bonded laminate 14a and a second adhesively bonded laminate 14b, and
b. eliminate the conventional drilling and riveting of the lapped laminates 14a,14b prior to welding.

While in accordance with the patent statutes preferred and alternative embodiments of this invention have been illustrated and described in detail, it is to be particularly understood that the invention is not limited thereto or thereby.

I claim:
1. A welded joint having:
   a. an S-shaped metal connector provided with a first laminate cavity and a second laminate cavity,
   b. a first adhesively bonded laminate disposed in said first laminate cavity,
   c. a second adhesively bonded laminate disposed in said second laminate cavity,
      1. said first adhesively bonded laminate and said second adhesively bonded laminate each having a first metal member, a second metal member and an electrically insulating adhesive between said first metal member and said second metal member, and
      2. said first adhesively bonded laminate and said second adhesively bonded laminate being disposed in said first laminate cavity and said second laminate cavity respectively so that said first metal members and said second metal members are in contact with said metal connector and being resistance welded together through the shunt path established by said S-shaped metal connector.

2. The welded joint recited in claim 1 wherein said first metal members are formed from the same metallic material.

3. The welded joint recited in claim 1 wherein said first metal members are formed from different metallic materials.

4. The welded joint recited in claim 1 wherein said second metal members are formed from the same metallic material.

5. The welded joint recited in claim 1 wherein said second metal members are formed from different metallic materials.

6. The welded joint recited in claim 1 wherein one laminate of said first adhesively bonded laminate and said second adhesively bonded laminate fit into one cavity of said first laminate cavity and said second laminate cavity with a clearance fit.

7. The welded joint recited in claim 1 wherein one laminate of said first adhesively bonded laminate and said second adhesively bonded laminate fit into one cavity of said first laminate cavity and said second laminate cavity with a snug fit.

UNITED STATES PATENT OFFICE
CERTIFICATE OF CORRECTION

Patent No. 3,576,964            Dated May 4, 1971

Inventor(s) Alvin R. Williams

It is certified that error appears in the above-identified patent and that said Letters Patent are hereby corrected as shown below:

Column 2, line 5, before "4000" insert -- CYBOND --; line 6, "Cybond" should read -- CYBOND --.

Signed and sealed this 17th day of August 1971.

(SEAL)
Attest:

EDWARD M. FLETCHER, JR.             WILLIAM E. SCHUYLER, J
Attesting Officer                       Commissioner of Patent